United States Patent [19]

Boye et al.

[11] Patent Number: 5,172,930
[45] Date of Patent: Dec. 22, 1992

[54] LOAD LEVELING ATTACHMENT FOR LEAF SPRING SUSPENSION AND METHOD THEREFOR

[76] Inventors: Brian A. Boye, 1102 Sunhaven, Laurel, Mont. 59044; Richard A. Holzinger, Box 395, Lake Andes, S. Dak. 57356; Leslie H. Zuck, 3306 Zack Burke La., Billings, Mont. 59106

[21] Appl. No.: 665,565

[22] Filed: Mar. 6, 1991

[51] Int. Cl.⁵ .......................................... B60G 11/02
[52] U.S. Cl. ..................................... 280/718; 280/720
[58] Field of Search ................. 267/44, 260, 265, 261, 267/28; 280/689, 699, 718, 720, 721, 723

[56] References Cited

U.S. PATENT DOCUMENTS

| | | | |
|---|---|---|---|
| 1,217,970 | 3/1917 | McIntyre | 280/718 |
| 1,937,854 | 12/1933 | Stratton | 267/28 |
| 2,825,578 | 3/1958 | Walker | 267/28 |
| 3,069,149 | 12/1962 | Neff | 267/33 |
| 3,097,839 | 7/1963 | Hirst | 267/11 |
| 3,420,544 | 1/1969 | Draves | 280/124 |
| 3,462,169 | 8/1969 | Carter | 280/124 |
| 3,491,994 | 1/1970 | Reynolds | 280/718 |
| 3,572,749 | 3/1971 | Robertson et al. | 280/124 |
| 3,606,376 | 9/1971 | Hickman | 280/124 RS |
| 3,782,754 | 1/1974 | Sleichter | 280/124 R |
| 3,799,571 | 3/1974 | Sudberry | 280/124 R |
| 3,850,444 | 11/1974 | Wright et al. | 280/124 R |
| 3,897,844 | 8/1975 | Chevalier | 180/71 |
| 3,920,264 | 11/1975 | Lafferty | 280/124 R |
| 3,969,230 | 1/1961 | Scheublein, Jr. et al. | 267/16 |
| 4,456,232 | 6/1984 | Shinbori et al. | 280/718 |
| 4,633,564 | 1/1987 | Sauber | 29/401.1 |
| 4,671,535 | 6/1987 | Hanson et al. | 280/718 |

OTHER PUBLICATIONS

Hellwig Suspensions Catalog, pp. 54–55 published 1991.

Primary Examiner—Kenneth R. Rice
Attorney, Agent, or Firm—Dorr, Carson, Sloan & Peterson

[57] ABSTRACT

The present invention provides an attachment for a vehicular leaf spring suspension system which redistributes the load on the vehicle to provide a level vehicle. The present invention, in one embodiment provides shoe members mounted on body members attached to the vehicle frame adjacent the leaf spring suspension systems. The shoe members are mounted on the body members on an eccentric axis to be pivotable relative to the body members.

The shoe members are held in a non-engaging position when the vehicle is not to undergo overloading. When heavy loading is to occur, the shoe members are pivoted to an engaging position near the upper surface of the leaf springs. Abutment portions on the shoe members contact the leaf springs in a position normal to the planar surface of the leaf springs at the point of engagement. The engagement of the shoe members with the leaf springs at a point spaced from the end of the leaf springs effectively shortens the leaf springs to redistribute the load from the rear of the vehicle to the front of the vehicle to provide a more level load. The shoe members are designed to be pivoted by a remote control cable, or by other remote control operations.

26 Claims, 4 Drawing Sheets

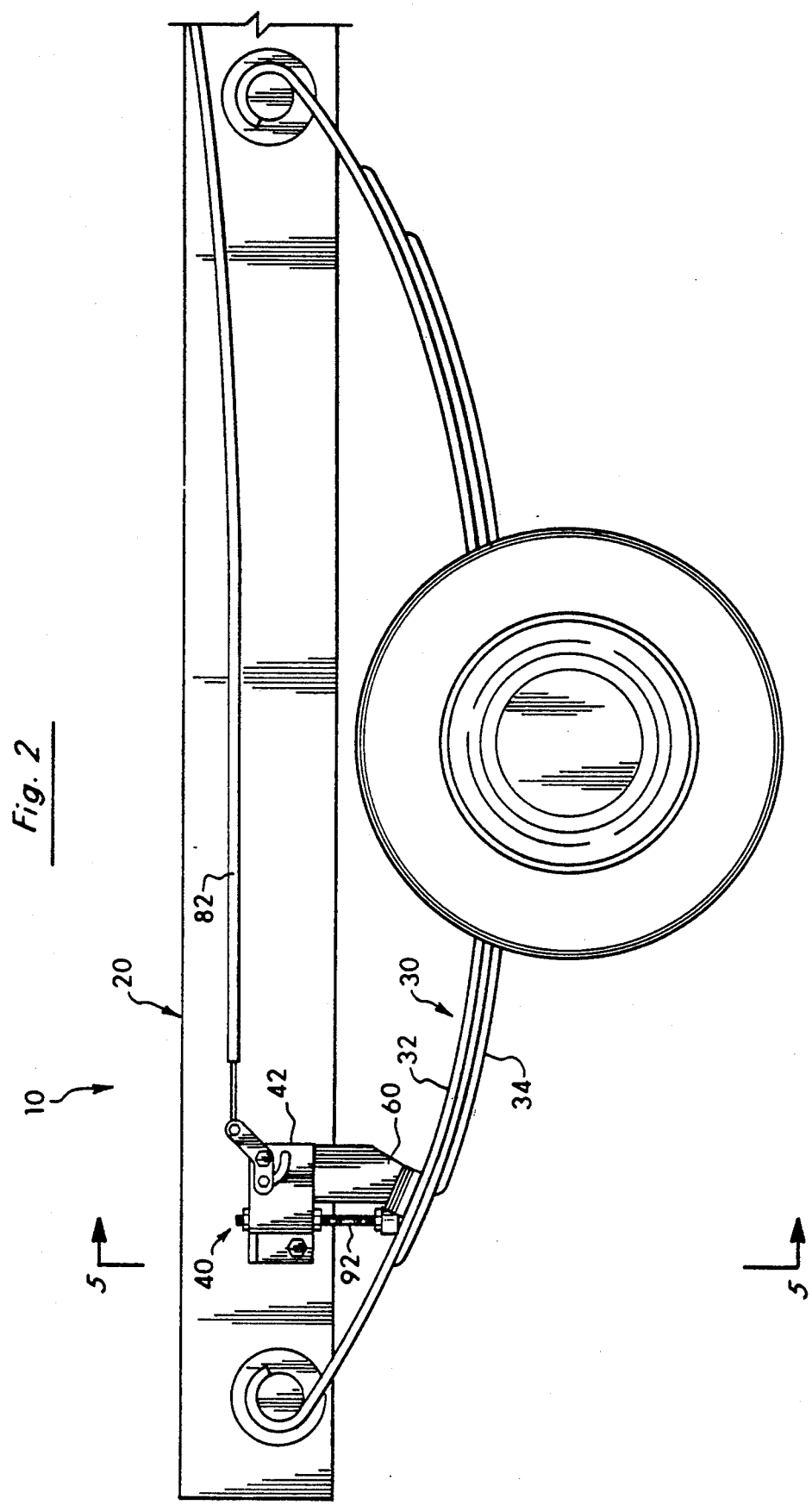

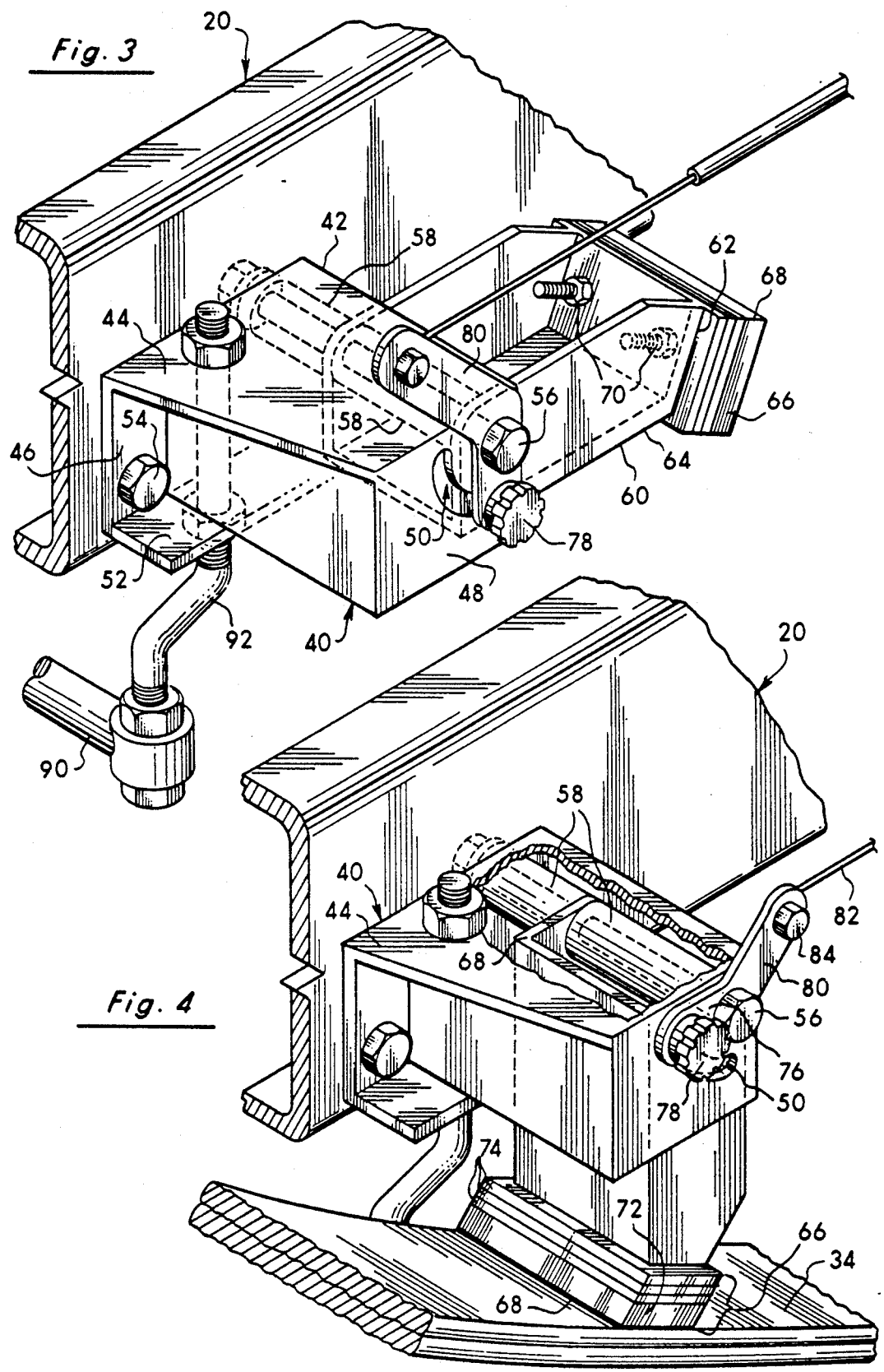

LOAD LEVELING ATTACHMENT FOR LEAF SPRING SUSPENSION AND METHOD THEREFOR

BACKGROUND OF THE INVENTION

1. Field of the Invention

The present invention relates to the field of to level the load on vehicular suspension systems.

2. Statement of the Problems

Vehicles, particularly trucks, are often overloaded or at least undergo heavy load conditions, by carrying a cargo greater than originally intended for the vehicle, by pulling a trailer or by other means. Typically when this type of loading occurs, the rear suspension is unable to maintain the vehicle in a level mode, causing problems in the ride, clearance and steering of the vehicle.

A number of prior devices have been attached on vehicles which frequently undergo heavy loading conditions to prevent or reduce the problems associated with such loading. These devices range from the use of additional springs or compressed gas bladders to rubber bumpers. These are used to prevent compression of the existing springs due to heavy loads. These types of overload springs create a stiffer suspension system, even when there is no overload.

Another type of device for heavy loaded suspension systems redistributes the load on the suspension system. This type of device is normally used on leaf spring suspensions for contact with the upper portion of the leaf springs under heavy load conditions. This contact effectively shortens the operative length of the leaf springs when the heavy load conditions occur causing redistribution of the load from the rear of the vehicle to the front of the vehicle. However, this prior device must be manually adjusted and manually moved into position when heavy loading is to occur. This typically requires crawling underneath the vehicle to adjust or move the device. A stiffer suspension results if such a device is not moved out of position when the vehicle is not to undergo heavy loading. Also, these prior devices extend downward perpendicularly from the frame of the vehicle and thus engage the leaf springs in a position at an acute angle to the planar surface of the springs at the point of engagement. This creates greater forces from the spring against the device in a direction tangential to the point of engagement. This creates greater torque on the device. The device will also engage in a line contact against the spring causing wear and abrasion on both the device and the spring.

A need exists therefore, for a device which is easily attachable to a vehicle to be readily positioned to level the load on a heavy loaded suspension system.

3. Solution to the Problem

These and other problems are solved by the present invention. The present invention provides an attachment for a vehicular suspension system using leaf springs to redistribute and level the load on a heavy loaded suspension system. The present invention provides a device easily movable into position for a heavy load or moved out of position under normal conditions, either manually or by remote control operation.

The present invention provides a device which directs the forces from the suspension system to restrain the device in place.

The present invention provides a system readily attachable to existing vehicles.

The present invention further provides a stabilizer to equalize the loads to prevent sway on the rear of the vehicle.

These and other features of the claimed invention are evident from the foregoing description taken in conjunction with the drawings.

SUMMARY OF THE INVENTION

The present invention provides an attachment for a vehicular leaf spring suspension system which redistributes the load on the vehicle to provide a level vehicle The present invention, in one embodiment, provides shoe members mounted on body members attached to the vehicle frame adjacent the leaf spring suspension systems. The shoe members are mounted on the body members on an eccentric axis to be pivotable relative to the body members.

The shoe members are held in a non-engaging position when the vehicle is not to undergo heavy loading. When heavy loading is to occur, the shoe members are pivoted to an engaging position near the upper surface of the leaf springs. Abutment portions on the shoe members contact the leaf springs in a position normal to the planar surface of the leaf springs at the point of engagement. The resulting force from the leaf springs retain the shoe members in the engaging position. The engagement of the shoe members with the leaf springs at a point spaced from the end of the leaf springs effectively shortens the operative length of the leaf springs to redistribute the load from the rear of the vehicle to the front of the vehicle to provide a more level load.

The shoe members are designed to be pivoted by a remote control cable, or by other remote control operations. This allows the shoe members to be moved into either position quickly and easily as the situation requires.

An adjustable stabilizer bar is mounted between the body members of the load-leveling attachments. The stabilizer bar redistributes uneven loading between the suspension systems. This provides a level, stable load side to side on the vehicle.

Thus, the system provides load-leveling rear to front and side to side to allow improved vehicle handling when heavily loaded.

These features and others of the claimed invention will become evident from the ensuing detailed description of a preferred embodiment taken in conjunction with the drawings.

BRIEF DESCRIPTION OF THE DRAWINGS

FIG. 2 shows the embodiment of FIG. 1 in the engaged position.

FIG. 3 is a rear perspective view of the embodiment of FIG. 2 in the non-engaged position.

FIG. 4 is a rear perspective view of the embodiment of FIG. 2 in the engaged position.

DETAILED DESCRIPTION OF PREFERRED EMBODIMENT

The present invention is directed to an attachment for a vehicular suspension system using leaf springs. The device of the present invention is designed to be operable to effectively shorten the operative length of the leaf springs under heavy load conditions to redistribute the load from the rear of the vehicle to the front of the vehicle and to be easily movable out of the way when heavy loading is not contemplated. The device of the present invention also engages the springs in such a way that the forces from the spring are directed to maintain the device in the engaged position and to reduce the wear and abrasion on the device and on the springs.

One possible preferred embodiment is illustrated in FIGS. 1–5. This descriptive embodiment is for explanatory purposes only and is not meant to limit the claimed invention. Other variations and embodiments are considered to be within the scope of the claimed inventive concept.

Figure 1:
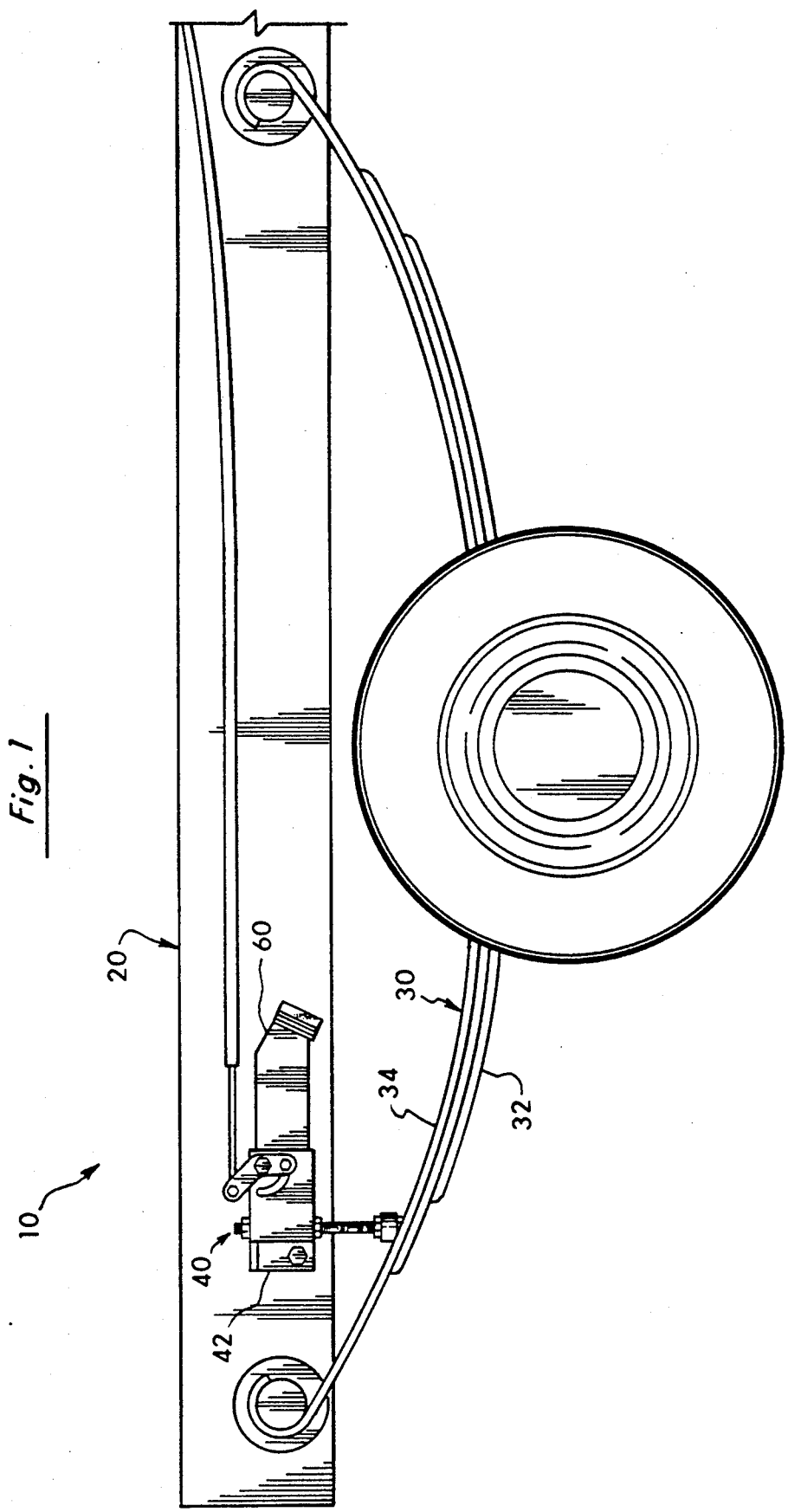
FIG. 1 is a side view of a leaf spring suspension system having an embodiment of the present invention attached thereto.

As shown in FIG. 1, vehicle 10 has a leaf spring suspension system 30 mounted onto frame 20 of vehicle 10. Load-leveling attachment 40 is mounted onto frame 20 adjacent leaf spring suspension system 30. As illustrated in FIG. 1, load-leveling attachment 40 is in the non-engaging position for use in operating conditions for when no heavy loading is contemplated.

Figure 5:
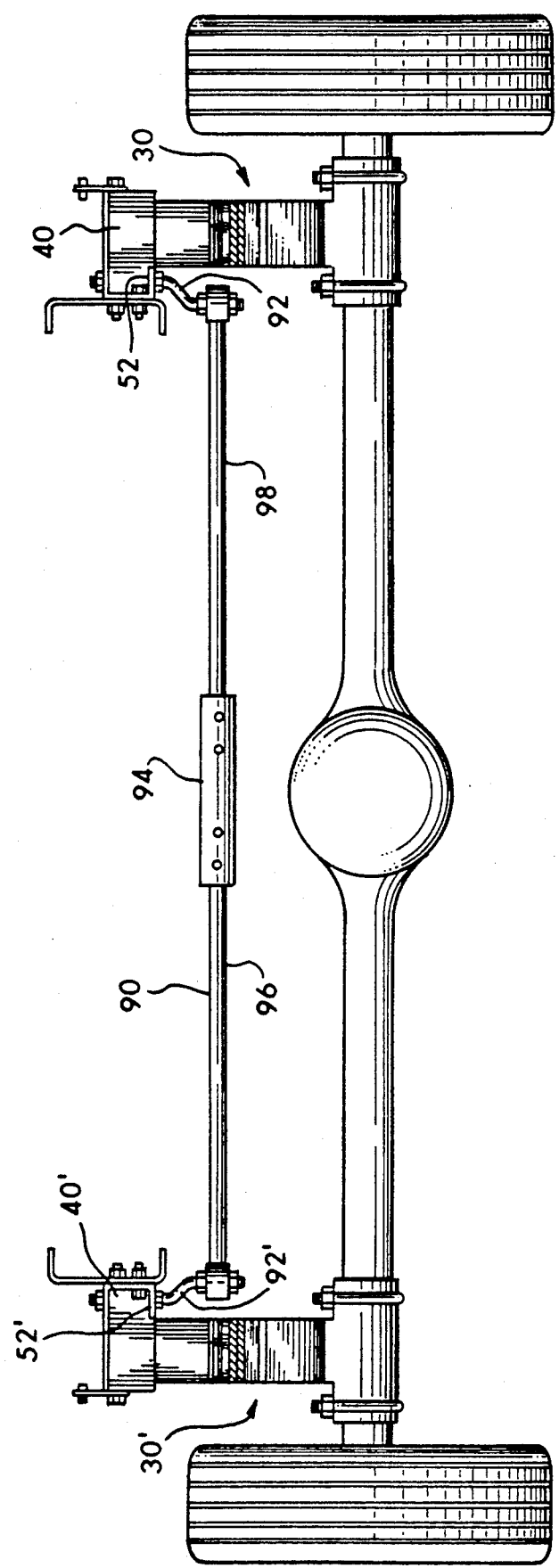
FIG. 5 is a rear view of the stabilizer bar of an embodiment of the present invention.

Vehicle 10 has two leaf suspension systems 30, 30' as shown in FIG. 5, on opposing sides of the vehicle to fully support the vehicle. For the sake of brevity, only one suspension system 30 will be illustrated and discussed. Likewise, an additional load-leveling attachment 40' (partially shown in FIG. 5) would be mounted on the second leaf spring suspension system 30'. Load-leveling attachment member 40' would be similar to load-leveling attachment member 40 except the structure would be reversed for mounting and operation on the opposite of the vehicle.

Load-leveling attachment 40 includes body member 42 mounted onto frame 20 and shoe member 60 pivotally mounted onto body 42 member as discussed below. Cable 82 extends from load-leveling attachment 40 to a remote location (not shown) such as the driver's compartment of the vehicle as discussed below.

Load-leveling attachment 40 is shown in the engaging position in FIG. 2. Shoe member 60 extends substantially perpendicular from frame 20 to engage the surface of upper leaf spring 34 of leaf spring suspension system 30. Shoe abutment member 66, described in greater detail below, engages upper leaf spring 34 in a position substantially normal to the planar surface of upper leaf spring 34. As the vehicle undergoes a heavy load, load-leveling attachment 40 operating in the engaged position illustrated in FIG. 2 effectively shortens the operative length of the leaf spring suspension system. This has the effect of redistributing the load from the rear of the vehicle to the front of the vehicle. This balances the load and levels the vehicle to allow improved handling of the loaded vehicle.

The point of engagement of shoe abutment member 66 with upper leaf spring 34 is predetermined to be at the outer end of lower leaf sprig 32 which is the shortest of the leaf springs of leaf spring suspension system 30. This is the most effective point for redistributing the loads. However, other points of engagement are considered to be within the realm of the inventive concept as claimed.

Shoe abutment member 66 is designed to engage upper leaf spring 34 in a position normal to the planar surface of leaf spring 34 at the point of engagement. Since shoe abutment member 66 is normal to the planar surface, the forces resulting from the leaf spring suspension system are directly applied across the front surface 68 of shoe abutment member 66.

This accomplishes several important functions. The radial and tangential components of the resulting force from the spring suspension system are directed into load-leveling attachment 40 to reduce to the torque acting against load-leveling attachment 40 and frame 20. Also, since the forces are distributed over the front surface 68 of shoe abutment member 66 instead of across a line engagement, the wear and abrasion is reduced on both shoe abutment member 66 and on the upper surface of upper leaf spring 34. Another important function accomplished by this design is the retention of shoe member 60 in the engaging position due to the forces from leaf spring suspension system 30 as discussed fully below. The design as claimed may encompass other features not fully discussed.

The attachment of body member 42 of load-leveling attachment 40 to frame 20 of vehicle 10 is illustrated in FIG. 3. Body member 42 includes a rectangular box shape having upper surface 44, side surface 46 abutting against frame 20, side surface 48 with arcuate slot 50 formed therein, and lower ledge portion 52. Body member 42 is attached to frame 10 by bolt 54 and bolt 56. The invention is not meant to be limited by this method of attachment but may utilize other attachment methods as known in the art.

Shoe member 60 is attached to body member 42 by bolt 56. Bushings 58 allow shoe member 60 to freely pivot about bolt 56 relative to body member 42. The position of bolt 56 through the upper right portion of body member 42 provides an eccentric pivot axis for shoe member 60 relative to body member 42.

Shoe member 60 has a substantially rectangular channel shape with lower surface 62 formed at an obtuse angle relative to front surface 64 of shoe member. Other shapes of body members 42 and shoe members 60 may be utilized within the claimed inventive concept.

Shoe abutment member 66 is attached to shoe member 60 on angled front surface 64 by screws 70 which are recessed into front surface 68 of shoe abutment member 66. Shoe abutment member 66 includes rubber engaging portion 72 and adjustment shims 74. The length of shoe abutment member 66 can be altered as needed by adding or removing adjustment shims 74.

Pin 76 extends through arcuate slot 48 secured to the upper portion of shoe member 60. Wing nut 78 is threadingly mounted onto pin 76 to lock shoe member 60 in the desired position. Lever 80 is mounted onto body member 42 by bolt 56 and secured to shoe member 60 by pin 76 and wing nut 78 to pivot as shoe member 60 pivots.

Remote control cable 82 is attached to lever 80 by pin 84. The other end of remote control cable 82 is mounted in an area readily accessible to an operator, such as in the driver's compartment of the vehicle (not shown). Cable 82, in this preferred embodiment, is a two-way locking cable. Operation of cable 82 pulls or pushes lever 80 to pivot shoe member 60 relative to body member 42. Once shoe member 60 is in the desired position, cable 82 is lockable to secure shoe member 60 in position. The claimed invention also contemplates other types of remote control operation, such as but not limited to, vacuum operation, electronic operation, and the like. Also, the use of hydraulics is contemplated as an alternative embodiment within the scope of the claimed invention.

Shoe member 42 shown in FIG. 4, is in the engaging position to engage the upper surface of upper leaf spring 34 when the vehicle undergoes a heavy load. Front surface 68 of shoe abutment member 66 engages upper surface of upper leaf spring 34 in a position normal to the planar surface of the leaf spring. Resulting forces from the leaf spring suspension system 30 from the load are directed across front surface 68. This force lodges the upper surface of shoe member 60 against the lower surface of upper portion 44 of body member 42 to retain shoe member 60 in the engaging position when an overload occurs. Shoe member 60 is thus prevented from pivoting out of the engaging position when leaf spring suspension is under a heavy load. Locking cable 82 is sufficient to lock shoe member 60 in position when no loading occurs on leaf spring suspension 30. Wing nut 78 can be tightened to lock shoe member in position if remote control cable 82 is not used or if it is desired to maintain shoe member 60 in a position indefinitely.

Stabilizer bar 90 is attached to load-leveling attachment 40, 40' as illustrated in FIG. 5, to reduce or prevent sway on leaf spring suspension system 30 of the vehicle. Stabilizer bar 90 is secured by end portions 92, 92' onto bottom ledge portions 52, 52' of load-leveling attachments 40, 40'. Stabilizer bar 90 is adjustable by adjustment tube 94, bar members 96, 98, and end portions 92, 92'. Bar members 96, 98 include diametrical holes formed near their end portions which are inserted in adjustment tube 94. When the approximate length of stabilizer bar 90 is determined for the vehicle on which the load-leveling attachment system is being mounted, pins are inserted through adjustment tube 94 and bar members 96, 98. Fine adjustment on the length is accomplished by pivoting the eccentrically mounted end portions 92, 92. Other types of stabilizer bars and adjustment techniques are considered to be covered within the claimed inventive concept.

Stabilizer bar 90 prevents or reduces sway on the vehicle due to uneven loading of the vehicle by applying a torque on the suspension springs which have a lighter load. This redistributes the load from side to side to provide a more even load distribution on the suspension system.

Operation

Shoe member 60 is locked in the non-engaging position shown in FIG. 1 and FIG. 3 when the vehicle is not about to undergo a heavy load. When an occasion arises where the vehicle is about to load-levelinged, such as transporting a heavy cargo or pulling a trailer, cable 82 is operated to pivot shoe member 60 downward until the upper surface of shoe member 60 contacts the underside of surface 44 of body member 42 which is the engaging position. Cable 82 is then locked into this position. If a remote control cable is not installed on the device, shoe member 60 is manually pivoted into the engaging position and wing nut 78 is tightened to lock shoe member in position.

When the heavy loading no longer occurs, cable 82 or wing nut 78 is operated to pivot shoe member 60 upward into the non-engaging position.

The present invention is designed to provide a load-leveling attachment for overloaded leaf spring suspension systems. The present invention provides an easily usable attachment to effectively redistribute the load on a suspension system without compromising the existing suspension system when an load-leveling attachment is not necessary.

It is to be expressly understood that the present invention as claimed is not to be limited to the above description but encompasses other variations and modifications within the claimed inventive concept.

We claim:

1. A load-leveling suspension attachment for a vehicular leaf spring suspension system having a pair of leaf springs mounted on the vehicle frame for fully supporting the load on the vehicle, said attachment comprising:
    a first body adapted to be mounted onto the frame of the vehicle adjacent a first of said pair of leaf springs;
    first means connected to said first body for operatively shortening said first leaf springs as said suspension system undergoes heavy loading conditions to balance the load on said vehicle;
    said first means include abutment means for selectively engaging said first leaf springs in a position normal to the planar surface of said first leaf springs at the point of engagement;
    a second body adapted to be mounted onto said frame adjacent the second of said pair of leaf springs; and
    second means connected to said second body for operatively shortening said second leaf springs as said suspension system undergoes heavy loading conditions to balance the load on said
    said second means include abutment means for selectively engaging said second leaf springs in a position normal to the planar surface of said second leaf springs at the point of engagement.

2. The attachment of claim 1 wherein said first abutment means selectively engage said first leaf springs at a first predetermined distance; and
    said second abutment means selectively engage said second leaf springs at a second predetermined distance.

3. The attachment of claim 2 wherein said first predetermined distance is selected so that said first means operatively shorten the length of said first leaf springs to the length of the shortest leaf of said first leaf springs; and
    said second predetermined distance is selected so that said second means operatively shorten the length of said second leaf springs to the length of the shortest leaf of said second leaf springs.

4. The attachment of claim 1 wherein said first means are attached to said first body to be selectively movable from a position not engaging said first leaf springs to a position engaging said first leaf springs; and
    said second means are attached to said second body to be selectively movable from a position not engaging said second leaf springs to a position engaging said second leaf springs.

5. The attachment of claim 4 wherein said first means are movable from said non-engaging position to said engaging position by remote control means; and
    said second means are movable from said engaging position to said non-engaging position by remote control means.

6. The attachment of claim 1 wherein said first means are pivotally mounted to said first body to selectively engage and disengage said first leaf springs; and
    said second means are pivotally mounted to said second body to selectively engage and disengage said second leaf springs.

7. The attachment of claim 6 wherein said first means are mounted to said first body by an eccentric pivot so that as first means engages said first leaf springs the force from said first leaf springs retains said first means in said engagement position; and said second means are mounted to said second body by an eccentric pivot so that as second means engages said second leaf springs the force from said second leaf springs retains said second means in said engagement position.

8. The attachment of claim 7 wherein said first means are movable from said non-engaging position to said engaging position by remote control means; and said second means are movable from said non-engaging position to said engaging position by remote control means.

9. The attachment of claim 8 wherein said attachment further comprises means for locking said first means and said second means in both said engaging position and said non-engaging position.

10. The attachment of claim 9 wherein said remote control means comprise a two-way locking cable.

11. The attachment of claim 1 wherein said attachment further comprises a stabilizer bar mounted between said first body and said second body to stabilize the load between said first leaf springs and said second leaf springs.

12. A load-leveling suspension attachment for a vehicular leaf spring suspension system having a pair of leaf springs mounted on the vehicle frame for supporting loads on the vehicle, said attachment comprising:

a first body adapted to be mounted onto the frame of the vehicle adjacent a first of said pair of leaf springs;

a first shoe pivotally mounted to said first body at an eccentric pivot point for selective movement from a position not engaging said first leaf springs to a position to engage said first leaf springs to operatively shorten said first leaf springs as said first leaf springs undergoes heavy loading conditions to balance the load on the vehicle, wherein said eccentric pivoting of said first shoe causes the force from said first leaf springs against said first shoe retains said first shoe in said engaged position;

a second body adapted to be mounted to said frame adjacent the second of said pair of leaf springs; and a second shoe pivotally mounted to said second body at an eccentric pivot point for selective movement from a position not engaging said second leaf springs to a position to engage said second leaf springs to operatively shorten said second leaf springs as said second leaf springs undergoes heavy loading conditions to balance the load on the vehicle, wherein said eccentric pivoting of said second shoe causes the force from said second leaf springs against said second shoe retains said second shoe in said engaged position.

13. The attachment of claim 12 wherein said attachment further comprises a stabilizer bar mounted between said first body and said second body to stabilize the load between said first leaf springs and said second leaf springs.

14. The attachment of claim 12 wherein said attachment further comprises means for locking said first shoe in said engaging position and said non-engaging position; and means for locking said second shoe in said engaging position and said non-engaging position.

15. The attachment of claim 12 wherein said first shoe is selectively moved from said engaged position and said disengaged position by remote control means; and said second shoe is selectively moved from said engaged position and said disengaged position by remote control means.

16. The attachment of claim 15 wherein said remote control means include a two-way locking cable.

17. The attachment of claim 12 wherein said first shoe engages said first leaf springs in a position normal to the planar surface of said first leaf springs at the point of engagement; and said second shoe engages said second leaf springs in a position normal to the planar surface of said second leaf springs at the point of engagement.

18. A load-leveling suspension attachment for a vehicular leaf spring suspension system having a pair of leaf springs mounted on the vehicle frame, said attachment comprising:

a first body adapted to be mounted onto the frame of the vehicle adjacent a first of said pair of leaf springs;

a first shoe mounted onto said first body to pivot about an eccentric axis relative to said first body for selective movement from a position not engaging said first leaf springs to a position to engage said first leaf springs to operatively shorten said first leaf springs as said first leaf spring undergoes heavy loading conditions to balance the load on the vehicle;

said first shoe engaging said first leaf springs in said engaging position in a position normal to the planar surface of said first leaf springs so the force from said first leaf springs retains said first shoe against said first body due to the eccentric axis of mounting;

a second body adapted to be mounted onto the frame of the vehicle adjacent the second of said pair of leaf springs;

a second shoe mounted onto said second body to pivot about an eccentric axis relative to said second body for selective movement from a position not engaging said second leaf springs to a position to engage said second leaf springs to operatively shorten said second leaf springs as said second leaf springs undergoes heavy loading conditions to balance the load on the vehicle; and said second shoe engaging said second leaf springs in said engaging position in a position normal to the planar surface of said second leaf springs so the force from said second leaf springs retains said second shoe against said second body due to the eccentric axis of mounting.

19. The attachment of claim 18 wherein said attachment further comprises a stabilizer bar mounted between said first body and said second body to stabilize said suspension system.

20. The attachment of claim 18 wherein said first shoe is movable from said non-engaging position and from said engaging position by remote control means; and said second shoe is movable from said non-engaging position and from said engaging position by said remote control means.

21. The attachment of claim 20 wherein said remote control means comprise a two-way locking cable.

22. The attachment of claim 18 wherein said first shoe and said second shoe include rubber abutment-means and adjustment shims.

23. A method of leveling a heavily loaded suspension system having a pair of leaf springs mounted on a vehicle frame, said method comprising the steps of:

mounting a first eccentrically pivotable shoe on said frame at a predetermined distance adjacent a first of said pair of leaf springs;

mounting a second eccentrically pivotable shoe on said frame at a predetermined distance adjacent the second of said pair of leaf springs;

selectively moving said first shoe and said second shoe into position to engage said first leaf springs and said second leaf springs respectively, as said leaf springs are overloaded to operatively shorten the length of said first and second leaf springs to level the load on said vehicle.

24. The method of claim 23 wherein said method fur comprises the step of:

selectively moving said first shoe and said second shoe to a position not engaging aid leaf springs when the vehicle is not overloaded.

25. The method of claim 23 wherein said method further comprises the steps of:

moving said first shoe and said second shoe into said engagement position so that said first shoe and said second shoe engage said leaf springs in a position normal to the planar surfaces of said leaf springs so the force from said leaf springs retains said eccentrically mounted shoes in position.

26. The method of claim 23 wherein said method further comprises the step of:

selectively moving said first shoe and said second shoe by remote control operation.

* * * * *